United States Patent [19]

DeHaitre

[11] Patent Number: 5,454,675
[45] Date of Patent: Oct. 3, 1995

[54] SEALING NUT AND METHOD OF MAKING SAME

[75] Inventor: Lon DeHaitre, Arlington Heights, Ill.

[73] Assignee: Abbott-Interfast Corporation, Wheeling, Ill.

[21] Appl. No.: 233,335

[22] Filed: Apr. 26, 1994

[51] Int. Cl.$^6$ .............................. F16B 37/08; F16B 39/34
[52] U.S. Cl. ........................ 411/303; 411/369; 411/432; 411/542; 470/18
[58] Field of Search .................................. 411/302, 303, 411/369, 432, 533, 542, 907, 908; 470/18, 19

[56] References Cited

U.S. PATENT DOCUMENTS

| | | |
|---|---|---|
| 2,450,694 | 10/1948 | Sauer . |
| 2,751,806 | 6/1956 | Dickie . |
| 3,001,567 | 9/1961 | Brill . |
| 3,030,997 | 4/1962 | Collins . |
| 3,168,321 | 2/1965 | Glicksman . |
| 3,265,107 | 8/1966 | Glicksman . |
| 3,289,724 | 12/1966 | Ernest ...................................... 411/303 |
| 3,316,952 | 5/1967 | Hollinger . |
| 3,399,589 | 9/1968 | Breed . |
| 3,520,342 | 7/1970 | Scheffer . |
| 3,550,498 | 12/1970 | Briles . |
| 3,557,654 | 1/1971 | Weidner, Jr. . |
| 3,572,414 | 3/1971 | Onufer . |
| 3,622,167 | 11/1971 | Velthoven . |
| 3,635,272 | 1/1972 | Scheffer . |
| 4,004,626 | 1/1977 | Biblin et al. . |
| 4,019,550 | 4/1977 | DeHaitre . |
| 4,126,170 | 11/1978 | DeHaitre . |
| 4,282,913 | 8/1981 | Trimmer . |
| 4,367,060 | 1/1983 | Berecz . |
| 4,482,278 | 11/1984 | Dorn . |
| 4,907,924 | 3/1990 | Hellon . |

Primary Examiner—Neill R. Wilson
Attorney, Agent, or Firm—Welsh & Katz, Ltd.

[57] ABSTRACT

A sealing nut has an annular heat stabilized nylon sealing insert retained within a recess in a metallic nut body by a coined collar on the nut body. The sealing insert is initially formed symmetrical about a transverse median plane to enable bidirectional assembly into the nut body recess, and undergoes dynamic preloading when the collar is coined onto the periphery of the insert. When installed onto a threaded shaft extending from a bearing surface so that the coined collar is torqued against the bearing surface, the sealing insert forms a fluid-tight seal between the threaded shaft and a threaded bore in the bearing surface through which the threaded shaft extends. The nut body and sealing insert facilitate reduced manufacturing costs while enabling re-use without significant loss in sealing properties.

25 Claims, 1 Drawing Sheet

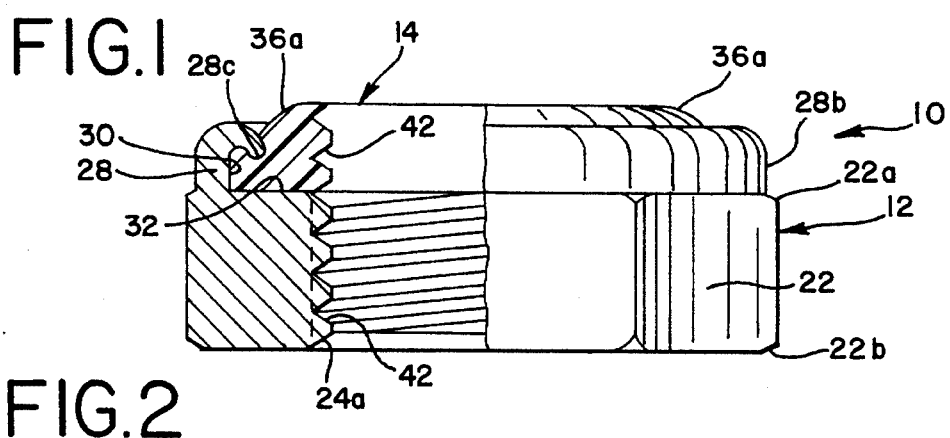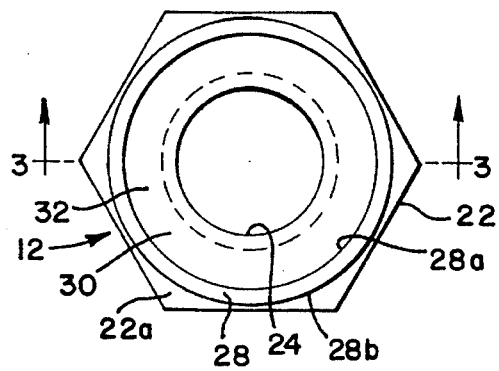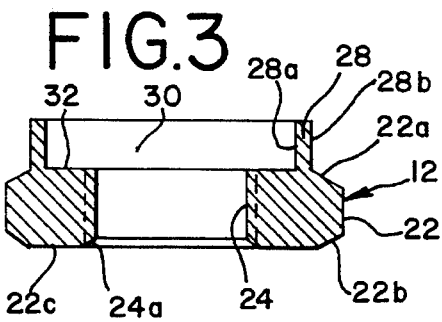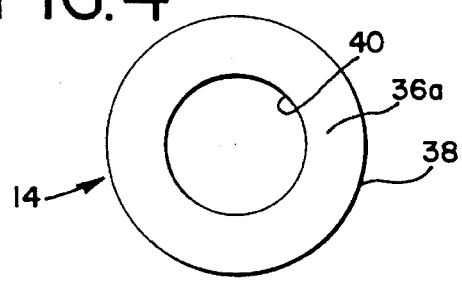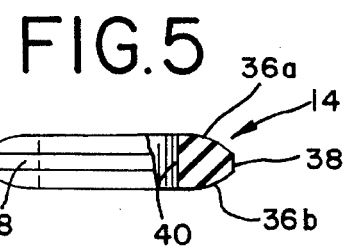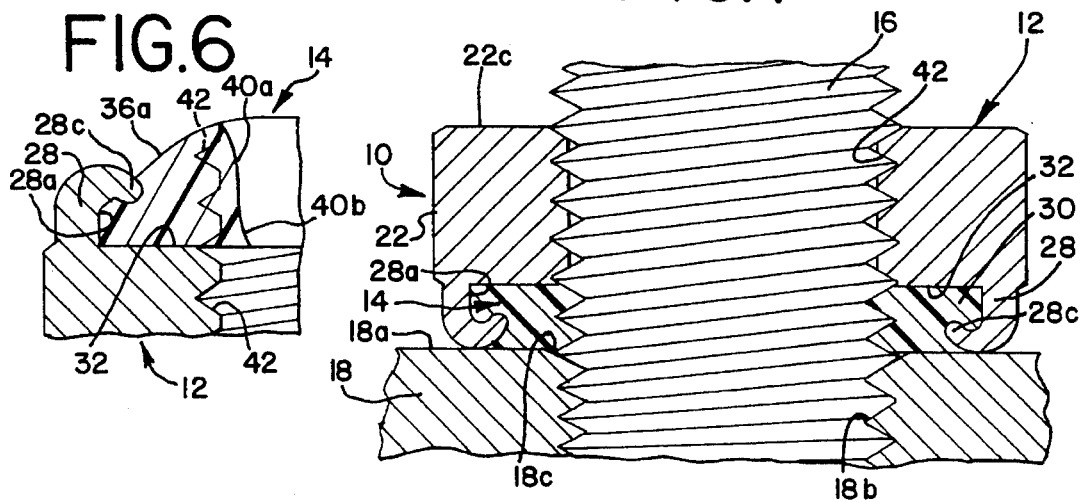

SEALING NUT AND METHOD OF MAKING SAME

BACKGROUND OF THE INVENTION

The present invention relates to sealing nuts, and more particularly to a novel sealing nut having a nut body and sealing insert which provide improved performance and cost reduction over prior sealing nuts.

Sealing nuts are known which employ a nut body having a recess adjacent one end in which a sealing insert is retained, and wherein an internally threaded bore through the nut body and insert enable mounting of the sealing nut on a threaded shaft. In one prior sealing nut, such as disclosed in U.S. Pat. No. 4,019,550 which is owned by the assignee of the present invention and incorporated herein by reference, a coined annular lip on the nut body retains the sealing insert within the nut body recess. As the nut is threaded onto a threaded shaft, the annular lip is caused to engage a bearing surface through which the threaded shaft extends so that a protrusion or crown of the insert is compressed into sealing relation with the threaded shaft. Such sealing nuts find particular application as high pressure hydraulic sealing nuts but may also be utilized with equal efficiency in other applications. Other prior sealing nuts are described in U.S. Pat. No. 4,019,550 and their shortcomings discussed.

The various features enumerated for the sealing nut disclosed in U.S. Pat. No. 4,019,550 apply equally to the sealing nut of the present invention. In this respect, the sealing nut of the present invention provides metal-to-metal contact of the nut body against the bearing surface through which the threaded shaft extends so that the sealing insert flows into sealing engagement with the threaded shaft; both the nut body and sealing insert are tapped with a continuous axial thread; the sealing nut is reusable without significant loss of sealing ability; and the nut can withstand high pressures without leakage. In addition, the sealing nut of the present invention lends itself to significantly reduced manufacturing costs. For example, most prior sealing nuts employ relatively expensive manufacturing techniques wherein the nut body is made by cold forming. A shortcoming of this technique is that close dimensional tolerances are difficult to achieve. Also, the prior sealing inserts have been made by injection molding techniques requiring movement of die members in both horizontal (X) and vertical (Y) axes during the injection process, thus requiring more costly dies with resulting increased manufacturing costs.

One of the primary objects of the present invention is to provide a novel improved sealing nut which includes a nut body having an annular sealing insert retained within a recess adjacent one end of the nut body, the nut body and sealing insert enabling reduced manufacturing costs while facilitating high pressure sealing of a threaded shaft extending from a bearing surface against which the sealing nut is engaged.

A more particular object of the present invention is to provide a novel sealing nut having a nut body which receives an annular sealing insert, and wherein the insert is bidirectionally insertable into a recess in the nut body and retained therein by an annular collar formed over the insert in a manner to dynamically preload the sealing insert with resulting greater fluid tight sealing about a threaded shaft on which the nut is mounted.

In carrying out the present invention, a metallic nut body is formed with a polygonal first end defining external wrench flats and having an axial bore, and an annular wall or collar adjacent an opposite end which defines an internal generally cylindrical recess concentric with the axial bore. A generally donut shaped insert made of a high impact resilient resin material is inserted into the recess. The annular wall or collar of the nut body is formed, as by coining, over the insert in a manner to mechanically encapsulate and dynamically preload the insert such that the insert undergoes a cross-sectional twisting action or partial inversion which causes the outer end of a cylindrical axial bore in the insert to increase slightly in diameter, and the diameter of the inner end of the insert bore to decrease. A uniform thread bore is formed axially through the nut body and sealing insert to facilitate mounting onto a threaded shaft. In installing the sealing nut, the nut body is torqued against a bearing surface through which the threaded shaft projects so that the coined annular wall or collar engages the bearing surface and the sealing insert is further dynamically compressed into fluid tight relation with the threaded shaft.

A feature of the sealing nut in accordance with the invention lies in the utilization of an annular nylon sealing insert which is generally symmetrical about a median plane transverse to the axis of the insert. This enables the insert to be bidirectionally inserted into the recess in the nut body. The insert undergoes a cross-sectional twisting action or partial inversion as the annular wall or collar of the nut body is formed over and compressed against the insert. This causes an outwardly facing end of the insert to be stretched outwardly and the inwardly facing end of the insert to be compressed inwardly adjacent an axial bore through the annular insert. This action dynamically preloads the insert and causes it to fill any voids in the nut body recess. An internal thread is then formed in the axial bore of the nut body and sealing insert.

Typical sealing nuts of the type employing sealing inserts encapsulated within a nut body require that the sealing insert engage at least a three-pitch length of the threaded shaft on which the nut is installed. A significant advantage of the sealing nut in accordance with the present invention is that for most applications the sealing insert forms a very effective liquid tight seal while engaging approximately a single-pitch length of the threaded shaft, thus requiring a significantly reduced volume of sealing insert material over prior sealing nuts.

Another feature of the sealing nut in accordance with the invention lies in pre-loading the sealing insert by forming the annular wall or collar of the nut body over the insert so as to compress the insert and stretch its outer exposed surface in a manner to inhibit shear and abrasion of the insert as it engages the runout area of a tapped bore in a bearing surface from which a threaded shaft extends during installation of the nut onto and removal from the threaded shaft.

Further objects, features and advantages of the sealing nut of the present invention will become apparent from the following detailed description of the invention taken in conjunction with the accompanying drawing wherein like reference numbers designate like elements throughout the several views.

BRIEF DESCRIPTION OF THE DRAWING

FIG. 1 is an elevational view of a sealing nut constructed in accordance with the present invention, half of the sealing nut being shown in longitudinal section;

FIG. 2 is a plan view of the nut body employed in the sealing nut of FIG. 1 but prior to assembly with the sealing insert;

FIG. 3 is a longitudinal sectional view of the sealing nut taken substantially along line 3—3 of FIG. 2;

FIG. 4 is a plan view of the sealing insert employed in the sealing nut of FIG. 1;

FIG. 5 is an elevational view of the sealing insert of FIG. 4 but with a fragmentary portion shown in longitudinal section;

FIG. 6 is a fragmentary longitudinal sectional view, on an enlarged scale, illustrating the sealing insert of FIG. 5 after it has undergone compressive cross-sectional inversion during forming of the nut body collar over the sealing insert; and FIG. 7 is a fragmentary longitudinal sectional view illustrating the sealing nut of FIG. 1 in operative sealing relation with a threaded shaft and bearing surface through which the threaded shaft extends.

DETAILED DESCRIPTION

Referring now to the drawing, a sealing nut constructed in accordance with the present invention is indicated generally at 10 in FIG. 1. Briefly, the sealing nut 10 includes a metallic nut body 12 having a sealing insert 14 made of a relatively tough nylon or resinous material retained within a recess in the nut body. The sealing nut 10 is adapted to be threaded onto a threaded shaft, a fragmentary portion of which is indicated at 16 in FIG. 6, and brought into engagement with a bearing surface 18a of a body 18 having a threaded bore 18b through which the threaded shaft 16 extends. The body 18 may comprise a metallic housing or other structure such that the threaded bore 18b is exposed to a pressurized fluid. As will become more apparent from the following description, the sealing nut 10 is threaded onto shaft 16 to engage the bearing surface 18a in metal-to-metal contact and effect a fluid-tight seal between shaft 16 and the runout at the intersection of the threaded bore 18b with the bearing surface.

The nut body 12 is preferably made of a non-corrosive metallic material, such as a suitable strength stainless steel, and may be formed by conventional screw machine techniques to enable close tolerance manufacture of the nut body. The nut body has an external polygonal circumferential surface 22 adjacent one end which, in the illustrated embodiment, comprises a hexagonal surface defining wrench flats for engagement with a spanner or wrench. The upper and lower peripheral margins of the hexagonal surface 22 are preferably chamfered, as indicated at 22a and 22b, in accordance with conventional practice. The nut body 12 is initially formed with a cylindrical axial bore 24 which intersects a planar outer end surface 22c at a chamfer 24a. The bore 24 will later be taped.

The nut body 12 has an annular wall or collar 28 formed integral with the polygonal end 22 concentric with the center axis of bore 24. The annular wall or collar 28 defines the outer annular margin of a generally cylindrical internal recess 30 having a generally transverse planar base surface 32 intersected by bore 24. The base surface 32 may have a slight frusto-conical concavity, such as a conical angle of approximately 10° relative to the base of the cone. The annular wall 28 has an outer diameter slightly less than the diameter of a circle internally tangent to the hexagonal wrench surface 22.

The sealing insert 14 has an annular generally donut or torus ring shape which is of uniform cross-sectional configuration about its full circumference. The sealing insert is molded independently of the nut body 12 and has upper and lower convex arcuate surfaces 36a and 36b which intersect an annular cylindrical outer peripheral surface 38. The sealing insert is formed with an axial cylindrical bore 40 having a diameter approximately equal to the diameter of the bore 24 in nut body 12.

The sealing insert 14 is preferably molded from a relatively tough, stiff yet resilient, high impact, high durometer, slippery resin material, such as nylon. A sealing insert material which finds particular use in high pressure hydraulic applications and is characterized as a heat stabilized-lubricated 66 nylon is commercially available under the trade name "Zytel ST801" by E.I. Du Pont de Nemours. This material is heat retardant to a temperature of approximately 105° C., and exhibits stiffness and memory characteristics that make it particularly suitable for the sealing nut 10. The lubricant may be a silicone which assists in removal of the sealing insert from a mold and reduces friction during installation and removal of the sealing nut 10.

The sealing insert 14 is symmetrical about a median plane transverse to the axis of the bore 40, thereby enabling bidirectional insertion within the recess 30; that is, the sealing insert can to be assembled into the recess 30 without regard to which convex outer surface 36a or 36b engages the base surface 32 of the recess. The diameter of the outer cylindrical surface 38 on the sealing insert is approximately equal to the diameter of the inner surface 28a of the annular wall 28 of nut body 12.

As aforedescribed, the sealing nut body 12 may be made by conventional screw machine techniques which facilitate economical manufacture of the sealing nut. For example, the nut body 12 may be made from bar stock having a hexagonal or other polygonal peripheral surface 22 by rotating a length of the bar stock about its longitudinal axis while cutting radially into the bar stock sufficiently to form an external cylindrical surface 28b contiguous to the polygonal surface portion of the bar stock. The polygonal surface portion will thus define one end of the nut body and the cylindrical surface will have a planar end surface defining a second or opposite end of the nut body. The cylindrical recess 30 is then formed internally of and concentric with the external cylindrical surface 28b so as to define an annular wall peripherally of said recess. The axial cylindrical bore 24 is then formed in the bar stock to extend the length of the nut body and intersect the recess 30 which is formed with a diameter greater than the axial bore and with the generally planar base surface 32 transverse to the longitudinal axis of the axial bore.

In assembling the nut body 12 and sealing insert 14, the sealing insert is placed within the recess 30 so that either of the convex outer surfaces 36a and 36b engages the recess base surface 32. In the relaxed state of insert 14, an annular void will be created between the sealing insert and the recess base 32. After placing the sealing insert within the recess 30, the annular wall or collar 28 of the nut body 12, which has an axial length less than the axial thickness of the sealing insert 14 as measured at the bore 40, is formed, as by coining, over the outer peripheral portion of the sealing insert so as to form a retaining lip, as indicated at 28c, which mechanically encapsulates the sealing insert in the nut body. As the outer end of annular wall 28 is formed over the outer periphery of the sealing insert 14, the sealing insert undergoes a dynamic preloading caused by the coined end of the annular wall compressing the sealing insert to effect a cross-sectional twisting or partial inversion action of the insert generally about a circular centerline centrally of the annular insert. Simultaneously, the sealing insert is compressed sufficiently to fill any voids between the insert and the recess base surface 32 so that the insert fully engages the annular base surface and the inner surface 28a of the annular wall 28.

Referring to FIG. 6, as the outer edge portion 28c of the annular wall or collar 28 is coined or rolled radially inwardly and downwardly onto the adjacent opposing surface 36a or 36b of the sealing insert 14, the sealing insert undergoes a dynamic preloading wherein the upper region of the insert adjacent bore 40 is stretched generally radially or arcuately outwardly, as depicted by surface line 40a. This is believed to cause the outer exposed surface of the sealing nut to become more resistant to shear and abrasion when the exposed insert surface engages a bearing surface peripherally of a threaded shaft on which the sealing nut is mounted, as will be described. Simultaneously, the initial dynamic preloading of the insert causes the annular region of the insert peripherally of bore 40 and adjacent the recess base surface 32 to be compressed generally radially inwardly, as represented by the surface line 40b. With the collar lip 28c thus formed onto the sealing insert as illustrated in FIGS. 1 and 6, the upper outwardly facing surface 36a of the sealing insert extends above or outwardly from a plane tangent to the uppermost surface of the coined wall or collar 28. It will be understood that the terms "upper", "lower", "upwardly", "downwardly" and "overlying" and the like as used herein describe the sealing nut characteristics as depicted in the various views. Such terms may require opposite directional definitions when the sealing nut or its components are considered when rotated 180° in the plane of the paper on which they are illustrated.

After assembling the insert within the recess 30 and coining the upper edge portion of the annular wall or collar 38 onto the sealing insert as described, a tap is run through the nut body bore 24 and axially aligned bore 40 of the retained sealing insert so as to form a continuous uniform internal thread axially through the sealing nut, as indicated at 42 in FIGS. 1 and 6.

In use, it is intended that the sealing nut 10 be threaded onto a threaded shaft, such as indicated at 16 in FIG. 7, so as to form a fluid tight seal between the threaded shaft and the threaded bore 18b in the body 18. The internal thread 42 in the nut body and sealing insert is formed to enable the sealing nut to spin freely along the length of the threaded shaft until the outwardly extending surface 36a of the sealing insert engages the bearing surface 18a. The sealing nut is then torqued farther onto shaft 16 to engage the outermost surface of the coined wall 28 in metal-to-metal contact with the bearing surface 18a. During such torquing of the sealing nut, the sealing insert 14 undergoes further compression and dynamic loading which causes the sealing insert to be compressed radially inwardly about the external thread on the threaded shaft 16. At this point, the sealing nut may be torqued more tightly against the bearing surface 18a by a wrench or other suitable tool so that the sealing insert undergoes cold flow and is forced into the thread of shaft 16 about at least a one-pitch length of the shaft adjacent the bearing surface 18a, and into a countersink 18c formed at the intersection of threaded bore 18b with the bearing surface 18a. The sealing insert will also be compressed into the runout formed at the intersection of the threaded bore 18b with the countersink surface 18c.

By preloading the sealing insert 14 within the nut body recess 30 through coining of the annular wall 28, taken with the configuration of the sealing insert 14, any void or cavity space within the recess 30 is eliminated so that all compressive energy created by tightening the sealing nut against the bearing surface 18 causes the sealing insert to be more strongly compressed against the outer thread of the threaded shaft 16 in sealing relation therewith. The toughness characteristics of the sealing insert enable the sealing nut 10 to be removed from the threaded shaft 16 and re-applied without significant loss of sealing properties.

Thus, in accordance with the present invention, a reusable sealing nut having improved sealing properties is provided wherein the nut body may be readily formed by conventional high volume screw machine techniques, and the annular sealing insert may be assembled into the nut body recess bidirectionally; that, is without concern for which outer annular surface of the sealing insert serves as the inner surface engaging the base surface 32 of recess 30.

While a preferred embodiment of the sealing nut and its method of manufacture in accordance with the present invention have been illustrated and described, it will be understood to those skilled in the art that changes and modifications may be made therein without the departing from the invention in its broader aspects. Various features of the invention are defined in the following claims.

What is claimed is:

1. A sealing nut adapted to be threaded onto a threaded shaft and brought into engagement with a bearing surface through which the shaft extends, said sealing nut comprising a nut body having an external peripheral wrench surface and a threaded axial bore intersecting a first end of the nut body, an annular collar on a second end of the nut body concentric to said axial bore, said collar defining a generally cylindrical recess internally thereof, and an annular sealing insert disposed within said recess and having a threaded axial bore of substantially the same thread size as said bore in said nut body, said sealing insert being substantially symmetrical about a median plane transverse to said axial bore prior to insertion into said recess so as to enable bidirectional insertion into said recess, said collar having an outer margin formed to engage and compress an outer surface of said sealing insert so as to cause said insert to undergo a partial inversion which dynamically preloads said sealing insert, said sealing insert having an external surface extending outwardly from said outer margin of said collar so as to be compressed in sealing relation with a threaded shaft when the sealing nut is mounted thereon with said collar compressed against a bearing surface through which the shaft extends.

2. A sealing nut as defined in claim 1 wherein said sealing insert and recess are sized so that said insert occupies substantially all of said recess when said outer margin of said collar is formed to compress said outer surface of said sealing insert.

3. A sealing nut as defined in claim 1 wherein said sealing insert is made from a relatively stiff, high durometer polyamide resin.

4. A sealing nut as defined in claim 1 wherein said annular collar has an axial height so that when said collar is formed to engage said sealing insert, a circular marginal edge of said collar has a diameter greater than the major diameter of the threaded bore formed in said insert.

5. A sealing nut as defined in claim 1 wherein said sealing insert has substantially identically configured opposite end surfaces each of which is defined by an annular convex surface merging at an inner diameter with said axial bore and merging at an outer diameter with a generally annular cylindrical surface defining an outer perimeter of said sealing insert, said axial bore having greater length than the 6. A sealing nut as defined in claim 1 wherein said recess has a substantially planar annular base surface disposed transverse to the longitudinal axis of said axial bore.

7. A sealing nut as defined in claim 1 wherein said sealing insert is of uniform transverse cross-sectional configuration about its full circumference.

8. A sealing nut as defined in claim 1 wherein said sealing insert is made from a relatively stiff high durometer nylon.

9. A sealing nut as defined in claim 8 wherein said nylon is characterized as a heat stabilized-lubricated 66 nylon.

10. A sealing nut as defined in claim 1 wherein said partial inversion of said sealing insert causes the outermost region of said insert adjacent its axial bore to be stretched generally radially outwardly, and causes the inwardly facing region of said insert adjacent its axial bore to be compressed generally radially inwardly.

11. A sealing nut as defined in claim 1 wherein said external peripheral wrench surface is defined by a polygonal surface formed on said first end of said nut body.

12. A sealing nut as defined in claim 1 wherein said threaded shaft extends through a threaded bore intersecting said bearing surface at an annular chamfer, said sealing insert being compressed against said threaded shaft and into said chamfer when said collar is compressed against said sealing surface.

13. A method of making a sealing nut comprising the steps of:

a. forming a nut body having first and second ends, an external polygonal surface at one of said ends, and an annular wall adjacent the other of said ends defining an internal axial recess, said nut body having an axial cylindrical bore extending from said one end and intersecting said recess;

b. forming an annular sealing insert defining a longitudinal bore and being symmetrical about a median plane transverse to said longitudinal axis, said insert having oppositely facing generally annular convex surfaces, and an outer diameter enabling bidirectional insertion into said recess;

c. inserting said sealing insert into said recess with one of said annular convex surfaces engaging a base surface of said recess;

d. forming said annular wall to overlie and compress said sealing insert so as to effect a partial inversion of said insert generally about an annular centerline through said insert; and e. forming a uniform thread through said axial and longitudinal bores to enable the sealing nut to be threaded onto a threaded shaft extending from a bearing surface with the portion of said annular wall overlying said sealing insert engaging said bearing surface to compress said insert against the threaded shaft in sealing relation.

14. The method as defined in claim 13 wherein said step of forming said annular wall to overlie and compress said sealing insert comprises forming said wall so that an annular marginal edge has a diameter greater than the diameter of the longitudinal bore in said sealing insert.

15. The method as defined in claim 13 wherein said annular wall is formed to cause an outer surface of said sealing insert to be stretched generally radially outwardly relative to said longitudinal bore, and cause an inner end of said insert to be compressed so as to fill any void areas between said insert and a base surface of said recess.

16. The method as defined in claim 13 wherein said longitudinal bore in said sealing insert is sized so that said longitudinal bore has a smaller diameter than the inner diameter of said uniform thread prior to forming said thread.

17. The method as defined in claim 13 wherein said sealing insert and recess are sized so that said insert occupies substantially all of said recess when said annular wall is formed to overlie and compress said sealing insert.

18. The method as defined in claim 13 wherein said sealing insert is made from a relatively stiff, high durometer polyamide resin.

19. The method as defined in claim 13 wherein said annular collar and said sealing insert are sized so that when said collar is formed to overlie and compress said sealing insert, an outer exposed surface of said collar insert extends generally axially outwardly from said formed annular wall and engages said bearing surface peripherally of the threaded shaft when the sealing nut is mounted on the shaft in operative relation therewith.

20. The method as defined in claim 13 wherein said step of forming said sealing insert includes forming said insert with substantially identically configured opposite end surfaces each of which is defined by an annular convex surface merging at an inner diameter with said longitudinal bore and merging at an outer diameter with a generally annular cylindrical surface defining an outer perimeter of said sealing insert, said longitudinal bore having greater length than the longitudinal length of said cylindrical surface.

21. The method as defined in claim 13 wherein said sealing insert is initially formed with a uniform transverse cross-sectional configuration about its full circumference.

22. The method as defined in claim 13 wherein said sealing insert is made from a relative stiff high durometer nylon.

23. The method as defined in claim 22 wherein said nylon is characterized as a heat stabilized-lubricated 66 nylon.

24. A method of making a sealing nut comprising the steps of:

a. forming a nut body from bar stock having a polygonal peripheral surface by rotating a length of said bar stock about its longitudinal axis while cutting radially into said bar stock sufficiently to form an external cylindrical surface contiguous to polygonal surface portion of the bar stock, said polygonal surface portion defining one end of the nut body and said cylindrical surface having an end surface defining a second end of the nut body;

b. forming an axial cylindrical bore in said bar stock to extend the length of the nut body;

c. forming a substantially cylindrical recess internally of and concentric with said external cylindrical surface so as to define an annular wall peripherally of said recess, said recess having a diameter greater than said axial bore and having a generally planar base surface transverse to the longitudinal axis of the axial bore, d. inserting an annular sealing insert into said recess, said sealing insert having a longitudinal bore of substantially similar diameter as said axial bore and being substantially symmetrical about a median plane transverse to said longitudinal bore so that said insert may be bidirectionally inserted into said recess;

e. forming a marginal annular end portion of said annular wall generally radially inwardly to overlie and compress an outwardly facing surface of said sealing insert so as to invert the outward sealing face of the insert and dynamically preload said insert; and f. forming an internal thread through the full lengths of said axial and longitudinal bores to enable the sealing nut to be threadedly mounted on a threaded shaft extending from a bearing surface so that said marginal annular end portion of said annular wall is compressed against said bearing surface with said sealing insert being compressed against said threaded shaft in sealing relation therewith.

25. A method of making a sealing nut comprising the steps of:

a. forming a nut body having a first end defined by an external polygonal peripheral surface portion coaxial with a longitudinal axis of the nut body, and having a second end defined by a cylindrical surface portion contiguous to said polygonal surface portion and of a diameter less than the diameter of a circle internally of but tangent to peripheral surfaces defined by said polygonal surface portion, b. forming an axial cylindrical bore in said nut body to extend the length of the nut body;

c. forming a substantially cylindrical recess internally of and concentric with said cylindrical surface portion so as to define an annular wall peripherally of said recess, said recess having a diameter greater than said axial bore and having a generally planar base surface transverse to the longitudinal axis of the axial bore, d. inserting an annular sealing insert into said recess, said sealing insert having a longitudinal bore of substantially similar diameter as said axial bore and being substantially symmetrical about a median plane transverse to said longitudinal bore so that said insert may be bidirectionally inserted into said recess;

e. forming a marginal annular end portion of said annular wall generally radially inwardly to overlie and compress an outwardly facing surface of said sealing insert to invert said outwardly facing surface and dynamically preload said insert; and f. forming an internal thread through the full lengths of said axial and longitudinal bores to enable the sealing nut to be threadedly mounted on a threaded shaft extending from a bearing surface so that said marginal annular end portion of said annular wall is compressed against said bearing surface with said sealing insert being compressed against said threaded shaft in sealing relation therewith.

* * * * *